(12) United States Patent
Planas Girona et al.

(10) Patent No.: US 8,215,462 B2
(45) Date of Patent: Jul. 10, 2012

(54) ACTUATION SYSTEM FOR A PARKING BRAKE

(75) Inventors: Albert Planas Girona, Terrassa (ES); Jordi Jornet Vidal, Terrassa (ES); Jaume Prat Terradas, Barcelona (ES)

(73) Assignee: Fico Cables, S.A, Mollet del Vallès (ES)

( * ) Notice: Subject to any disclaimer, the term of this patent is extended or adjusted under 35 U.S.C. 154(b) by 914 days.

(21) Appl. No.: 12/295,686

(22) PCT Filed: Apr. 10, 2007

(86) PCT No.: PCT/EP2007/003171
§ 371 (c)(1), (2), (4) Date: Oct. 1, 2008

(87) PCT Pub. No.: WO2007/115817
PCT Pub. Date: Oct. 18, 2007

(65) Prior Publication Data
US 2009/0107778 A1 Apr. 30, 2009

(30) Foreign Application Priority Data
Apr. 7, 2006 (DE) .................. 10 2006 016 497

(51) Int. Cl.
*B60T 11/04* (2006.01)

(52) U.S. Cl. ...................... 188/265; 188/2 D

(58) Field of Classification Search .............. 188/2 D, 188/204 R, 217, 216, 265; 74/512, 500.5
See application file for complete search history.

(56) References Cited

U.S. PATENT DOCUMENTS

| | | | |
|---|---|---|---|
| 4,850,242 A | | 7/1989 | Hass et al. |
| 5,131,288 A | * | 7/1992 | Barlas .............................. 74/512 |
| 6,755,284 B2 | * | 6/2004 | Revelis et al. ................ 188/2 D |
| 7,484,432 B2 | * | 2/2009 | Yamanaka ................... 74/502.6 |
| 2005/0077118 A1 | * | 4/2005 | Kubina et al. ................ 188/2 D |

FOREIGN PATENT DOCUMENTS

| | | |
|---|---|---|
| DE | 19941988 A1 | 3/2001 |
| DE | 10157462 A1 | 6/2003 |
| EP | 0432954 A2 | 6/1991 |
| EP | 1609690 A1 | 12/2005 |
| GB | 471910 | 9/1937 |
| GB | 734235 | 7/1955 |
| JP | 667236 | 9/1994 |

* cited by examiner

*Primary Examiner* — Robert A Siconolfi
*Assistant Examiner* — Anna Momper
(74) *Attorney, Agent, or Firm* — John D. Titus

(57) ABSTRACT

The present invention relates to an actuation system for a parking brake of a motor vehicle, comprising a foot or a hand-actuated manual actuation means (10) for tightening of the parking brake, wherein the parking brake is purely mechanically tightened via the actuation means, a locking mechanism (20) for tightening and releasing of the parking brake, wherein the actuation means (10) and the locking mechanism (20) are arranged at different positions of the motor vehicle, respectively.

12 Claims, 3 Drawing Sheets

20

20

ACTUATION SYSTEM FOR A PARKING BRAKE

CROSS-REFERENCE TO RELATED APPLICATIONS

Figure 1:
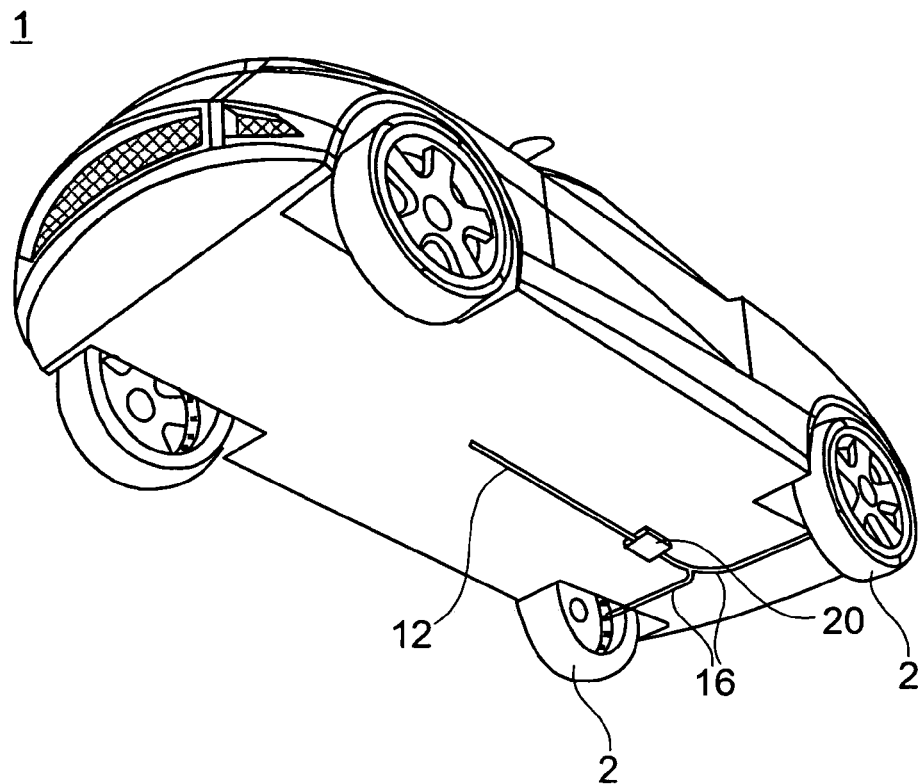

This application claims priority of international application no. PCT/EP2007/003171 filed Apr. 10, 2007, which claims priority of German patent application DE 10 2006 016 497.0 filed Apr. 7, 2006.

FIELD OF THE INVENTION

The present invention relates to an actuation system for a parking brake of a motor vehicle, particularly to a manually actuated parking brake which acts on the rear wheels.

PRIOR ART

In motor vehicles, the parking brake usually acts on the rear wheels of the motor vehicle. To this end, brake cables are tightened, which are connected to the brakes of the rear wheels by means of a hand-actuated parking brake unit or a foot-actuated parking brake unit.

Mechanical parking brake systems have to be arranged within the interior of the motor vehicle, such that the driver may reach them conveniently and can generate the required braking force. Further, the parking brake systems have to maintain the required braking force permanently and have to transmit the braking force securely to the rear wheels.

Such mechanical systems therefore have to be mounted in an appropriate way to the car body of the motor vehicle and require a certain space due to the required mechanical components for the locking of the hand or foot lever.

Due to this construction of manual parking brake systems, interior designers of motor vehicles are heavily constrained regarding the arrangement of the hand or foot lever unit.

Further, electrical parking brakes are known, which provide arbitrary design possibilities for the designer. Such electrical parking brakes, however, are quite expensive and susceptible for mechanical and electrical failures. Therefore, it can happen that the parking brake tightens accidentally due to an electric problem, but without a request of the driver. Further, the parking brake is always tightened with the same force if necessary or not. As a result, the brake cables and the brakes of the vehicle are unnecessarily strained.

It is therefore the technical problem to provide an actuation system for a parking brake, which can flexibly be arranged within the interior of the motor vehicle, and thereby provides the highest possible freedom of design for the interior designer.

Further, an actuation system for a parking brake should be provided which can be comfortably operated by the driver, which is more cost-efficient compared to electrical parking brakes, and which provides a high reliability.

SUMMARY OF THE INVENTION

The above-mentioned problems are solved by an actuation system for a parking brake according to patent claim 1.

Particularly, the above-mentioned problems are solved by an actuation system for a parking brake of a motor vehicle comprising a foot or a hand-actuated manual actuation means for tightening of the parking brake, wherein the parking brake is purely mechanically tightened via the actuation means, a locking mechanism for tightening and releasing of the parking brake, wherein the actuation means and the locking mechanism are arranged at different positions of the motor vehicle, respectively.

Due to the structural separation of manual actuation means and locking mechanism of the actuation system according to the invention, the interior designer has a high flexibility during the arrangement and design of the foot or hand-actuated actuation means. For example, such an actuation means can easily be integrated into the center console or the dashboard of a motor vehicle, since it can be constructed particularly small. Particularly, due to the structural separation, the actuation means can be easily designed mechanically, such that it can be arranged at almost any arbitrary position within the interior of the motor vehicle for the manual actuation by the driver.

Thereby, the locking mechanism of the actuation system, which comprises the required mechanical components for the locking of the brake, can be arranged at any arbitrary other position within the motor vehicle, where more space is available, for example at the rear area of the motor vehicle.

Further, the freedom of design is increased, since the actuation means can be designed lighter, since only during actuation of the parking brake a force is applied to the actuation means and the actual load of the parking brake in tightened condition is maintained by the locking mechanism. Therefore, the actuation means in general can be provided smaller and more unconventionally with respect to the materials used and the design.

Compared to electrical parking brakes the manually tightened parking brake described herein has the advantage that a tightening happens only if the driver for sure wants it. By means of the construction it is excluded that the parking brake accidentally tightens due to an electric problem.

Further, the driver can determine the force by which the parking brake is tightened. Thereby, over-stressing of the brake cables and the brakes of the vehicle is avoided. In total, thereby, the reliability is increased compared to electrical parking brakes.

Preferably, the locking mechanism is constructed such that it can be mounted at the area of the rear axle, below the middle tunnel, below the seats or within the engine compartment of the motor vehicle. Preferably, the locking mechanism is arranged where free space is available, preferably near the brakes to be actuated. Thereby, the brake cables, which run from the locking mechanism to the rear wheels, need to be very short, only.

In a preferred embodiment the actuation means is provided such that it can be arranged in the area of the center console or the dashboard of the motor vehicle for manual actuation by the driver.

In a preferred embodiment, the actuation means automatically returns into a rest position after the tightening of the parking brake. Thereby, always the same appearance at the interior of the motor vehicle is provided for a released as well as for a tightened parking brake. Particularly, the handbrake lever does not extend into the interior, such that new possibilities of design result. For example, the space between the front seats can be used more efficiently, and overall more space is provided.

In a further preferred embodiment, the actuation means for applying a braking force is connected with the locking mechanism via a first pulling cable. The transmission of forces from the actuation means to the locking mechanism preferably is done via a pulling cable, since it can be arranged within the motor vehicle almost arbitrarily. However, other possibilities are conceivable to connect the actuation means with the locking mechanism, for example via a linkage, etc.

In a further preferred embodiment, the locking mechanism comprises locking means to maintain the braking effect of the parking brake, wherein the locking means can mechanically be released by means of a second pulling cable from a remote position to release the brake effect. Thereby, the releasing of the parking brake can be done mechanically independent from the tightening of the parking brake. The actuation element for the releasing of the parking brake therefore can be also be arranged at any arbitrary suitable position within the motor vehicle, since it is connected to the locking mechanism via a second pulling cable. Therefore, huge possibilities of design result for the interior designer.

In a further preferred embodiment, the locking mechanism comprises of locking means to maintain the locking effect of the motor vehicle, wherein the locking means can be released from a remote position by means of an electric, pneumatic or hydraulic actuator, to release the brake effect. Instead of a mechanical actuation, also an electric, pneumatic or hydraulic actuation of the locking means can be done to release the brake effect. Thereby, again the interior designer has the freedom to choose the design of this actuation means. By means of such an actuator, the release of the parking brake can also be done automatically be means of the board electronics, if for example the driver inserts a gear and presses the accelerator pedal. Thereby, an automatic release of the parking brake is provided, like it is provided by electrical parking brakes, without having to accept the disadvantages described above.

In a further preferred embodiment, the locking mechanism comprises a follower disk for the actuation of brake cables, which is pivotably supported around a pivot axis, a pivot lever which is pivotably supported around the pivot axis, which is connected with the first pulling cable, wherein the pivot lever comprises a follower bolt, which rotates the follower disk during tightening of the brake, and wherein the pivot lever after the tightening returns to its rest position, independently from the follower disk.

By means of these elements of the locking mechanism, a simple and robust possibility is provided to tighten the brake cables, wherein the manual actuation means (hand lever or foot pedal) returns to its initial position after the tightening. Therefore, the optical appearance of the interior is the same for the tightened condition of the parking brake as for the released condition.

According to a further preferred embodiment, the follower bolt extends into a slot within the follower disk. My means of this embodiment, the pivot lever can freely pivot to a certain extent with respect to the follower disk.

In a further preferred embodiment, the pivot lever is connected with the first pulling cable via a deflection pulley. Therefore, according to the pulley principle a force increase of 2:1 results for the pivot lever with respect to the first pulling cable. Therefore, the pivot lever can be made particularly small and the locking mechanism in total only requires little space. Alternatively, the needed force decreases, which has to be applied by the driver via the actuation means for tightening of the parking brake. Therefore, the actuation means, its support and the first pulling cable can be designed particularly small and lightweight and can be easily integrated into the interior of the vehicle.

In a further preferred embodiment, the locking mechanism comprises a ratchet-pawl mechanism. A ratchet-pawl mechanism is a particularly simple and reliable possibility to lock the locking mechanism.

In another preferred embodiment, the locking mechanism comprises a torsion spring clutch, which comprises a rotatably supported cylinder and a torsion spring, which is wound around the cylinder. By means of torsion spring clutch, the locking mechanism can also be locked, wherein during the locking no disturbing noises appear. Additionally, the force, which is required to open the torsion spring, is independent from the braking force. The release force of a ratchet-pawl mechanism, however, is directly dependent from the brake force.

Therefore, a torsion spring clutch is suitable for an automatic release of the parking brake by means of an actuator.

In a further preferred embodiment, the follower disk comprises a toothed segment, which is in engagement with a pinion at the cylinder, wherein the pinion comprises a smaller diameter than the toothed segment. By the provision of such a gear drive, the pinion with the torsion spring clutch rotates faster than the follower disk with the toothed segment, during tightening or releasing of the locking mechanism. Therefore, for the locking of the locking mechanism, a smaller force has to be applied to the pinion, compared with the toothed segment. Due to this reason, also the torsion spring clutch, which engages the pinion and locks the pinion, can be provided smaller.

Further preferred embodiments of the invention result from the subclaims.

SHORT DESCRIPTION OF THE DRAWINGS

Figure 2:
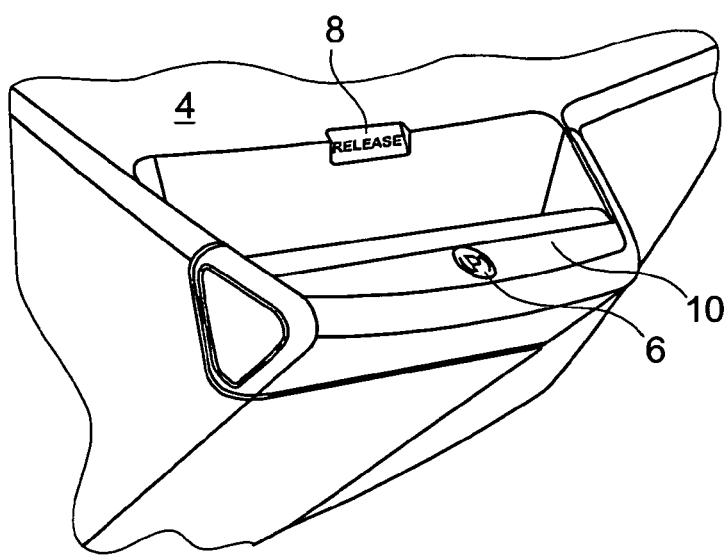
Figure 3:
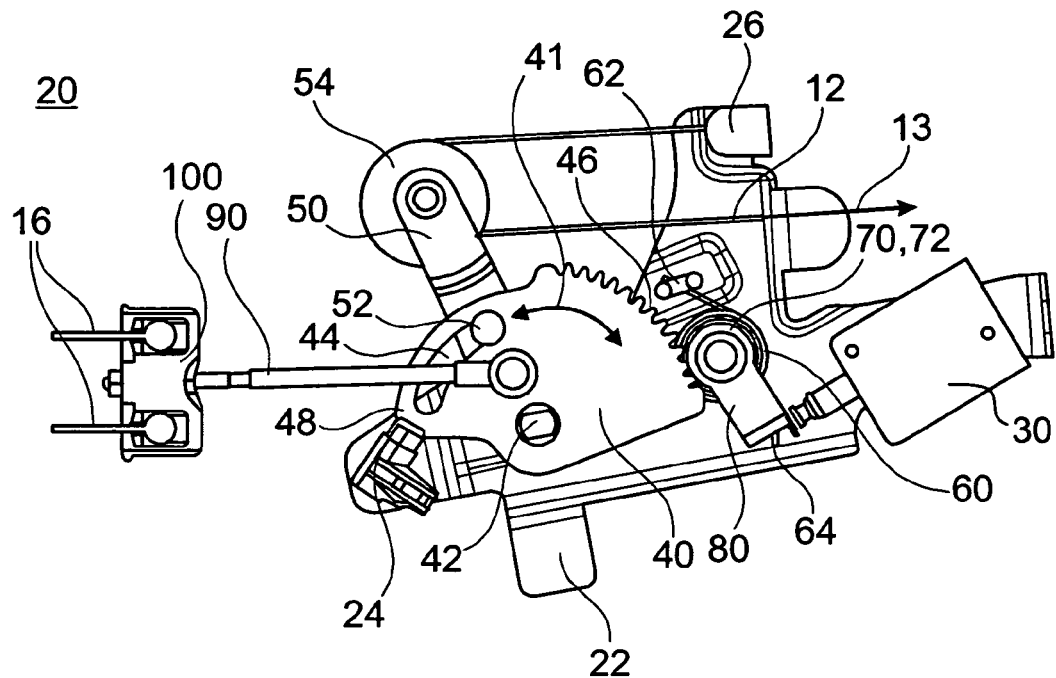
Figure 4:
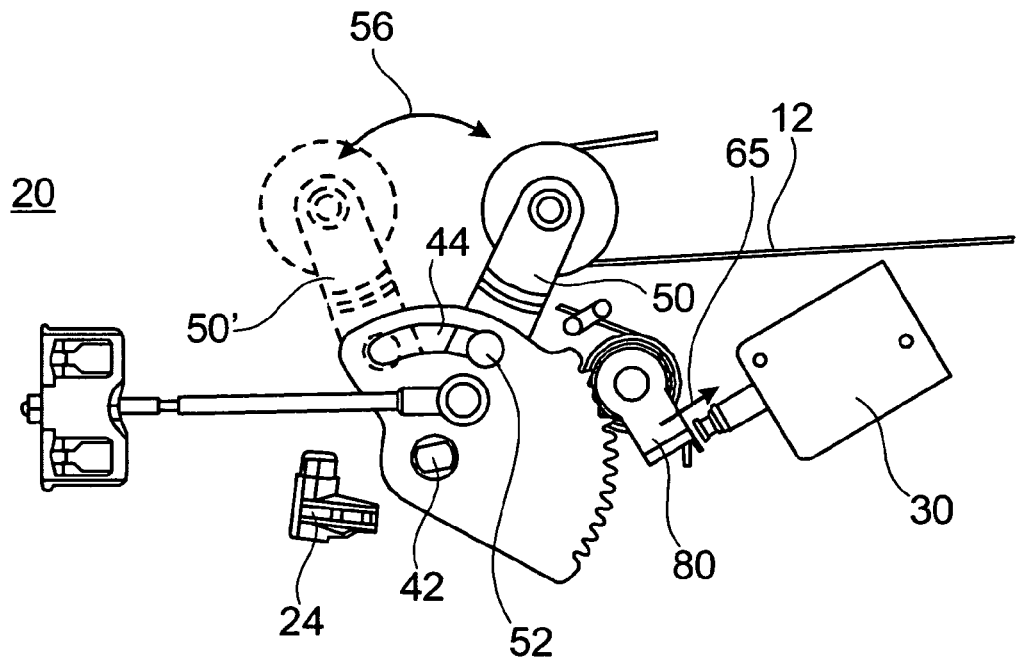
Figure 5:
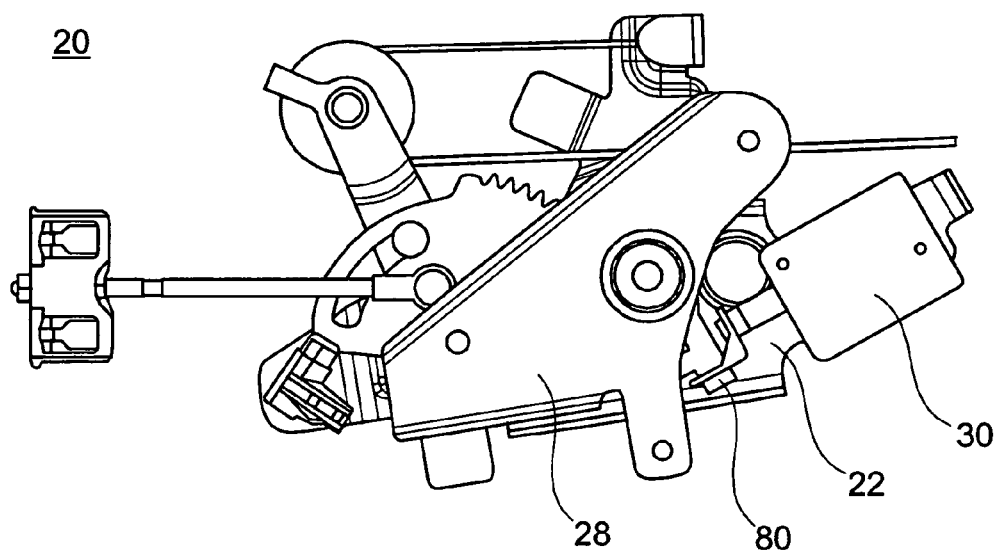
Figure 6:
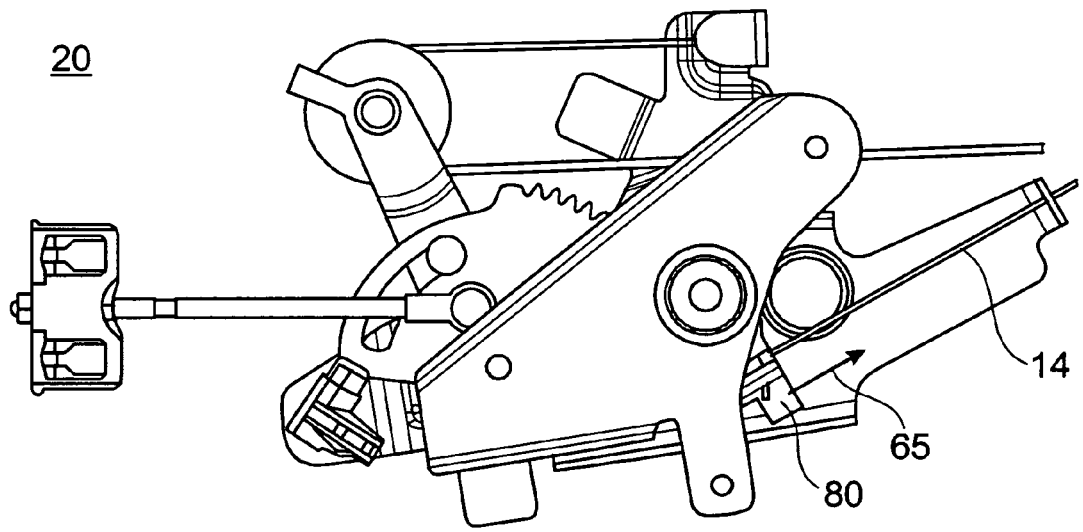

In the following preferred embodiments of the invention are described by means of the figures, in which shows:

FIG. 1: a schematic three-dimensional view of a motor vehicle from the bottom to show the arrangement of a locking mechanism according to the invention;

FIG. 2: a three-dimensional view of a dashboard of a motor vehicle with an actuation means;

FIG. 3: an elongational view of a preferred embodiment of a locking mechanism according to the invention, wherein parts thereof are eliminated to show the inner components in released condition;

FIG. 4: an elongational view of a preferred embodiment of a locking mechanism according to the invention, wherein parts thereof are eliminated to show the inner components in tightened condition;

FIG. 5: an elongational view of a preferred embodiment of a locking mechanism according to the invention in assembled condition with an element for electrical releasing; and FIG. 6: an elongational view of a preferred embodiment of a locking mechanism according to the invention in assembled condition with an element for mechanical releasing.

DESCRIPTION OF THE PREFERRED EMBODIMENTS

In the following, preferred embodiments of the present invention are described with respect to the figures.

FIG. 1 shows a schematic view of a motor vehicle 1 from the bottom. Usually, the rear wheels of a motor vehicle 1 are mechanically braked while tightening of the parking brake 2 via two brake cables 16. The brake cables 16 are connected with a locking mechanism 20 for locking and releasing of the parking brake 2. As shown in FIG. 1, the locking mechanism 20 is mounted in the area of the rear axle of the motor vehicle 1.

The force for the actuation of the locking mechanism 20 is mechanically transmitted via a first pulling cable 12, which is connected with a mechanical actuation means 10.

The actuation means 10 can be a foot lever or a handbrake lever of a conventional kind, wherein, however, no devices for the locking and releasing must be comprised. The actuation means 10 can also be unconventionally designed, as shown in FIG. 2 in the form of a handbrake lever 10, which comprises a U-shape and which is integrated into the dashboard 4 of the motor vehicle 1.

Due to the spacial and functional separation between actuation means 10 and locking mechanism 20, the interior designer of a motor vehicle 1 need to accept less restrictions with respect to the design of the actuation means 10, since with the actuation means 10, only manually a force has to be applied, however, the actuation means 10 itself must not be locked.

As it is shown in FIG. 2, the actuation means 10 can for example be integrated flush into the surface of the dashboard 4.

Since locking mechanism 20 and actuation means 10 are spacially and functionally separated from each other, it is also possible that the actuation means 10 automatically returns to its rest position, as it is shown for example in FIG. 2. Thereby, the actuation means 10 does also not extend from the center console 4 in tightened condition of the parking brake 2.

In order to signalize the driver if the parking brake is tightened or realized at the actuation means 10, for example at the shown lever 10, an optical display can be provided, which signalizes the actual status of the parking brake 2. For example, a signal lamp 6 can be integrated into the handle of the actuation means 10, which is enlighted if the parking brake 2 is tightened.

Additionally or alternatively, the status of the parking brake 2 can for example also be shown via an alphanumeric display. Further, a release knob 8 can be arranged at the actuation means 10, which releases the parking brake 2.

FIG. 3 shows an elongational view of a preferred embodiment of a locking mechanism 20 according to the invention with electrical release. The locking mechanism 20 consists of a frame 22, which is connected with the car body of the motor vehicle 1. At the frame 22, a follower disk 40 is pivotably mounted by means of a pivot axis 42, wherein at the follower disk 40 an actuation rod 90 is pivotably supported. The actuation rod 90 is connected with an equalizer element 100, at which brake cables 16 are mounted.

If the follower disk 40 is pivoted around the pivot axis 42, as indicated by arrow 41, the actuation rod 90 moves the equalizer element 100, and the brake cables 16 are tightened or released.

The equalizer element 100 is formed in the shaped of a balance and distributes the braking force, which was introduced from the actuation rod 90 equally onto both brake cables 16 for the right and left rear tire.

The locking mechanism 20 is further provided with a pivot lever 50, which rotates the follower disk 40 by means of a follower disk bolt 52 during tightening of the parking brake 2. To this end, the follower bolt 52 extends into a slot 44 which is curved around the pivot axis 52 within the follower disk 40. The pivot lever 50 can freely rotate around the pivot axis 52 with respect to the follower disk 40 and takes along the follower disk 40 if the follower bolt 52 abuts the end of the slot 44, as it is shown in FIG. 3.

The pivot lever 50 comprises of a deflection pulley 54 at its top end over which the first pulling cable 12 runs. The first pulling cable 12 is mounted at one end at a receptacle 26 of the frame 22 and at its other end at the actuation means 10. During tightening of the actuation means 10, the pulling cable 12 is tightened, as indicated by arrow 13, whereby the pivot lever 50 is pivoted around the pivot axis 42, as shown in FIG. 4. Thereby, the follower disk 40 is taken along by the follower bolt 55 and is likewise pivoted and the parking brake 2 is tightened.

By the deflection of the pulling cable 12 around the deflection pinion 54, a force transmission according to the pulley principle is provided. Therefore, the deflection pulley 54 does only move half as much as the distance the pulling cable 12 is pulled. Therefore, the force at the pivot lever 50 doubles and it can be provided shorter compared to the condition if the pulling cable 12 would be directly connected to the pivot lever 50.

After the tightening, the pivot lever 50 can return in its initial position—as shown in dotted lines in FIG. 4. This movement is also indicated by arrow 56. To this end, the pivot lever 50 is biased by means of a spring to its initial position 50'.

Correspondingly, also the actuation means 10 returns to its rest position, wherein the parking brake 2 remains tightened.

For the locking of the follower disk 40, i.e. for maintaining the braking effect of the parking brake 2, the locking mechanism 20 is provided with locking means 40, 50, 60, 70.

The locking means may comprise a conventional ratchet-pawl mechanism, as it is known from the prior art of conventional handbrake levers.

In the shown embodiment, the locking mechanism 20 comprises a torsion spring clutch 60, 70 which comprises a rotatably supported cylinder 70 and a torsion spring 60, which is wound around the cylinder 70. The rotatably supported cylinder 70 is provided with a pinion 72, which engages the toothed segment 46 of the follower disk 40.

The cylinder 70 is rotatably mounted at the frame 22 and is selectively blocked by the torsion spring 60. To this end, one end 62 of the torsion spring 60 is mounted at the frame 22. The other end 64 of the torsion spring 60 is connected with a release lever 80, which likewise is rotatably fixed at the frame 22. If the release lever 80 is pivoted and thereby also the end 64 of the torsion spring 60 is moved, the diameter of the torsion spring 60 can be increased or decreased.

The torsion spring clutch 60, 70 acts for the cylinder 70 as a one-way clutch, i.e. it allows a movement of the cylinder 70 in tightening direction of the parking brake 2, but blocks a movement in release direction.

For releasing of the parking brake 2, the release lever 80 is pivoted to the right, as shown in FIG. 4 by arrow 65, wherein the diameter of the torsion spring 60 is increased and thereby the cylinder 70 is released, such that is can freely rotate.

Thereby, also the follower disk 40 can freely rotate and the parking brake 2 is released. If the release lever 80 is not moved, the torsion spring 60 blocks the cylinder 70 in release direction, such that the follower disk 40 cannot return into the position shown in FIG. 3, and the brake effect of the parking brake 2 is maintained.

Since the follower disk 40 with respect to the pivot axis 42 comprises a larger diameter in the area of the toothed segment 46 compared to the pinion 72 of the rotatably supported cylinder 70, the cylinder 70 moves faster than the follower disk 40 during a movement of those parts. Therefore, the torsion spring 60 must only generate a small friction force to lock the cylinder 70. Therefore, the torsion spring 60 must not be dimensioned very powerful to maintain the brake force.

Further, the force to open the torsion spring 60 is independent from the braking force, what allows an easy release of the parking brake 2.

As indicated, it is necessary to release the follower disk 40 to release the parking brake 2, which is done by pivoting of the release lever 80. Such a pivoting of the release lever 80 can be done by means of an electric, pneumatic or hydraulic actuator 30, like it is shown in FIG. 5. Preferably, therefore an electric actuator 30 is used, which pulls the release lever 80 in direction of arrow 65.

As it is shown in FIG. 6, however, also a mechanical actuator, like for example a second pulling cable 14 can be used to move the release lever 80 in direction of the arrow 65, to release the parking brake 2.

An electric actuator 30, however, has the advantage that a release knob for the actuation of the electric actuator 30 can be arbitrarily arranged within the vehicle, for example at the dashboard of the motor vehicle 1. Further, the electric actuator 30 can also be controlled by the board electronics of the motor vehicle 1, and for example release the parking brake 2 automatically if the driver inserted a gear and actuates the accelerator pedal. By means of the actuation system according to the invention, therefore automatic release operations of the parking brake 2 are possible, which for example facilitate the starting at a hill.

Further, the release operation of the parking brake 2 can be controlled such that a release of the parking brake 2 is only possible if particular conditions are met, for example that the motor is running and the driver actuates the vehicle brakes.

To signalize the board electronics that the parking brakes 2 is tightened, the locking mechanism 20 further comprises a switch 24, as it is shown in FIGS. 3 and 4, which is actuated by a stop 48 at the follower disk 40.

The locking mechanism 20 further comprises, as shown in FIG. 5, a cover plate 28, which supports the inner components and which is connected with the frame 22.

The components of the locking mechanism 20 are preferably made of steel, however, fiberglass-reinforced plastic material, particularly PA can also be used for single or for all components. The actuation means 10 is preferably made of a plastic material and consists preferably of a fiberglass-reinforced PA.

LIST OF REFERENCE SIGNS

| | |
|---|---|
| 1 | motor vehicle |
| 2 | parking brake |
| 4 | dashboard |
| 6 | signal lamp |
| 8 | release knob |
| 10 | actuation means |
| 12 | first pulling cable |
| 13 | arrow |
| 14 | second pulling cable |
| 16 | brake cables |
| 20 | locking mechanism |
| 22 | frame |
| 24 | switch |
| 26 | receptacle |
| 28 | cover plate |
| 30 | actuator |
| 40 | follower disk |
| 41 | arrow |
| 42 | pivot axis |
| 44 | slot in follower disk |
| 46 | toothed segment |
| 48 | stop |
| 50 | pivot lever |
| 52 | follower bolt |
| 54 | deflection pulley |
| 56 | arrow |
| 60 | torsion spring |
| 62 | first end |
| 64 | second end |
| 65 | arrow |
| 70 | cylinder |
| 72 | pinion at the cylinder |
| 80 | release lever |
| 90 | actuation rod |
| 100 | equalizer element |

The invention claimed is:

1. Actuation system for a parking brake (2) of a motor vehicle (1), comprising:
   a) a foot or hand actuated manual actuation means (10) for tightening of the parking brake (2), the manual actuation means being moveable from a rest position to a tightened position;
   b) a locking mechanism (20) for holding and releasing of the parking brake (2);
   c) wherein the actuation means (10) and locking mechanism (20) are arranged at different positions of the motor vehicle (1), the parking brake (2) being purely mechanically tightened via the actuation means (10) which causes a follower disk (40) having a toothed segment (46) rotate about a first pivot axis (42) from a released to an engaged position;
   d) the locking mechanism (20) comprising a clutch (60, 70) having an engagement element (72) that engages the toothed segment (46) of follower disk (40) to hold the follower disk in the engaged position, while the manual actuation means (10) is returned to the rest position, the engagement element (72) being mounted to rotate about a rotational axis that is fixed relative to the first pivot axis (42), wherein the actuation means (10) rotates the follower disk (40) by means of a pivot lever (50) mounted for rotation about the first pivot axis (42), the pivot lever (50) having a follower bolt (52) that engages one end of an arcuate slot (44) formed in the follower disk (40).

2. Actuation system according to claim 1, wherein the pivot lever (50) is connected to actuation means (10) with a first pulling cable (12) that passes through a deflection pulley (54).

3. Actuation system according to claim 1, wherein the clutch (60, 70) comprises a ratchet-pawl-mechanism.

4. Actuation system according to claim 1, wherein the clutch (60, 70) comprises a torsion spring.

5. Actuation system for a parking brake (2) of a motor vehicle (1), comprising:
   a) a foot or hand actuated manual actuation means (10) for tightening of the parking brake (2), the manual actuation means being moveable from a rest position to a tightened position;
   b) a locking mechanism (20) for holding and releasing the parking brake (2);
   c) wherein the actuation means (10) and the locking mechanism (20) are arranged at different positions of the motor vehicle (1), the parking brake (2) being purely mechanically tightened via the actuation means (10);
   d) the locking mechanism (20) comprising a follower disk (40) having a toothed segment (46) and a pivot lever (50) attached to the actuation means (10), the follower disk (40) and the pivot lever (50) being mounted to rotate about a common first pivot axis (42), the follower disk (40) further comprising an arcuate slot (44) formed therein, the pivot lever (50) further comprising a follower bolt (52) disposed within the arcuate slot (44), whereby as the pivot lever (50) is rotated by the actuation means (10) moving to the tightened position, the follower bolt (52) engages one end of the arcuate slot (44) to move the follower disk (40) to the engaged position, the pivot lever (50) further being moveable to a rest position resting against the opposite end of the arcuate slot (44) as actuation means (10) is returned to the rest position;
   e) the locking mechanism (20) further comprising an engagement element (72) that engages the toothed segment (46) of the follower disk (40) to hold the follower disk (40) in the engaged position, while the manual actuation means (10) is returned to the rest position.

6. Actuation system according to claim 5, wherein the locking mechanism (20) is constructed such that it is mountable in the area of the rear axle, below the middle tunnel, below the seats or within the engine compartment of the motor vehicle (1).

7. Actuation system according to claim 5, wherein the actuation means (10) is provided such that it can be arranged in the area of the center console or the dashboard (4) of the motor vehicle (1) for manual actuation by the driver.

8. Actuation system according to claim 5, wherein the actuation means (10) is connected with the locking mechanism (20) via a first pulling cable (12) for introducing a brake force.

9. Actuation system according to claim 5, wherein the locking mechanism (20) can be mechanically released from a remote position by means of a second pulling cable (14), in order to release the brake effect.

10. Actuation system according to claim 5, wherein the locking mechanism (20) can be released from a remote position by means of an electric, pneumatic or hydraulic actuator (30), in order to release the brake effect.

11. Actuation system according to claim 5, wherein the engagement element (72) comprises a ratchet-pawl-mechanism.

12. Actuation system according to claim 5, wherein the engagement element (72) comprises a torsion spring clutch.

* * * * *